(12) United States Patent
Butler

(10) Patent No.: US 10,412,616 B1
(45) Date of Patent: Sep. 10, 2019

(54) EQUALIZED DATA LATENCY FOR USER APPLICATIONS IN A WIRELESS DATA NETWORK

(71) Applicant: Sprint Communications Company L.P., Overland Park, KS (US)

(72) Inventor: Robert Keith Butler, Overland Park, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 90 days.

(21) Appl. No.: 15/646,918

(22) Filed: Jul. 11, 2017

(51) Int. Cl.
H04W 28/02 (2009.01)
H04L 12/26 (2006.01)
H04W 36/08 (2009.01)

(52) U.S. Cl.
CPC ..... H04W 28/0236 (2013.01); H04L 43/0852 (2013.01); H04W 36/08 (2013.01)

(58) Field of Classification Search
CPC .................................................. H04W 36/0033
See application file for complete search history.

(56) References Cited

U.S. PATENT DOCUMENTS

| | | |
|---|---|---|
| 6,601,098 B1 | 7/2003 | Case et al. |
| 6,628,629 B1 | 9/2003 | Jorgensen |
| 6,640,248 B1 | 10/2003 | Jorgensen |
| 6,898,436 B2 | 5/2005 | Crockett et al. |
| 6,928,473 B1 | 8/2005 | Sundaram et al. |
| 7,151,946 B2 | 12/2006 | Maggenti et al. |
| 7,161,926 B2 | 1/2007 | Elson et al. |
| 7,600,014 B2 | 10/2009 | Russell et al. |
| 7,921,686 B2 | 4/2011 | Bagepalli et al. |
| 7,937,470 B2 | 5/2011 | Curley et al. |
| 8,620,370 B2 | 12/2013 | Sandberg et al. |
| 9,210,358 B2 | 12/2015 | Griffin |
| 9,473,616 B2 | 10/2016 | Griffin |
| 9,503,379 B2 | 11/2016 | Yang et al. |
| 2016/0227555 A1 | 8/2016 | Haberland et al. |
| 2017/0264961 A1* | 9/2017 | Lockton .................. G07F 17/32 |
| 2018/0242204 A1* | 8/2018 | Zhu .................... H04W 36/0033 |
| 2018/0262967 A1* | 9/2018 | Shiragaki .............. H04W 40/04 |

FOREIGN PATENT DOCUMENTS

| | | |
|---|---|---|
| WO | 2013175170 | 11/2013 |
| WO | 2014043420 | 3/2014 |

* cited by examiner

Primary Examiner — Kevin M Cunningham

(57) ABSTRACT

A wireless data network equalizes latency for a user application. A source application controller exchanges application data with user communication devices over source wireless access points for a user application session. The source application controller maintains equalized latency within a latency window on the application data exchanges. The source application controller identifies a handover event for a user communication device and determines if the equalized latency can be maintained. The source application controller hands over the application session to a target application controller when the equalized latency cannot be adequately maintained within the latency window. The target application controller then exchanges application data with the user communication devices over the wireless access points for the user application session. The target application controller maintains equalized latency within another latency window on the subsequent application data exchanges for the user application session.

18 Claims, 7 Drawing Sheets

EQUALIZED DATA LATENCY FOR USER APPLICATIONS IN A WIRELESS DATA NETWORK

TECHNICAL BACKGROUND

Data communication systems exchange user data for user communication devices to provide various data communication services. The user communication devices may be phones, computers, headsets, machines, and the like. The data communication services might be media conferencing, gaming, social networking, machine communications, and the like. To extend the range of these data communication services, the data communication systems deploy wireless access points that communicate over the air with wireless user communication devices. Current Fourth Generation (4G) wireless networks are being augmented with Fifth Generation 5G wireless networks. One of the features of the 5G networks is a dramatic improvement in data latency. Data latency is the amount of time that it takes to transfer data—either from source to destination or round-trip through the destination.

A popular way to deliver data communication services is through software applications that are downloaded to the user communication devices. The user communication devices then execute the software applications to access network application servers that deliver the data communication services. Mobile user communication devices use 4G and 5G wireless access points to access these network application servers. In many cases, the user applications are customized for execution by wireless mobile devices. Some of these customized user applications require extremely low 5G latency, while other user applications are fine with 4G latency.

A user application session with a set of user communication devices is often optimized when the data latencies between the application server and the user communication devices is the same. The users share the same application experience in real time. For example, a virtual reality gaming application may require equal data latency between the application server and the user headsets that generate the virtual reality gaming experience. Unfortunately, the network support for mobile user applications that require equalized latency is not yet optimal.

TECHNICAL OVERVIEW

A wireless data network equalizes latency for a user application. A source application controller exchanges application data with user communication devices over source wireless access points for a user application session. The source application controller maintains equalized latency within a latency window on the application data exchanges. The source application controller identifies a handover event for a user communication device and determines if the equalized latency can be maintained. The source application controller hands over the application session to a target application controller when the equalized latency cannot be adequately maintained within the latency window. The target application controller then exchanges application data with the user communication devices over the wireless access points for the user application session. The target application controller maintains equalized latency within another latency window on the subsequent application data exchanges for the user application session. In some examples, the application controllers comprise Network Function Virtualization (NFV) Virtual Network Functions (VNFs) that control Software Defined Network (SDN) controllers and SDN switches.

DETAILED DESCRIPTION

Figure 1:
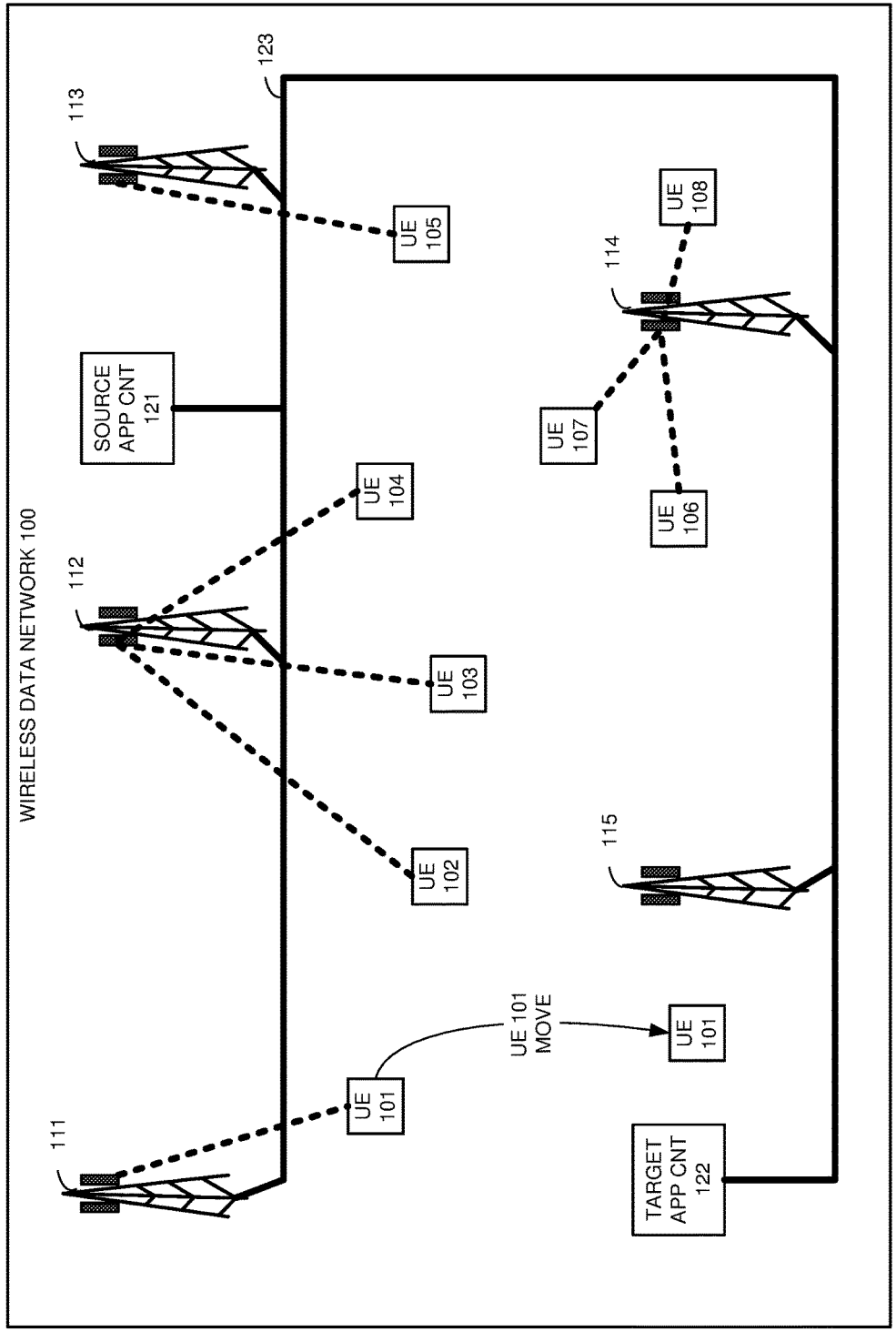
FIGS. 1-3 illustrate a wireless data network to equalize latency for a user application.
Figure 2:
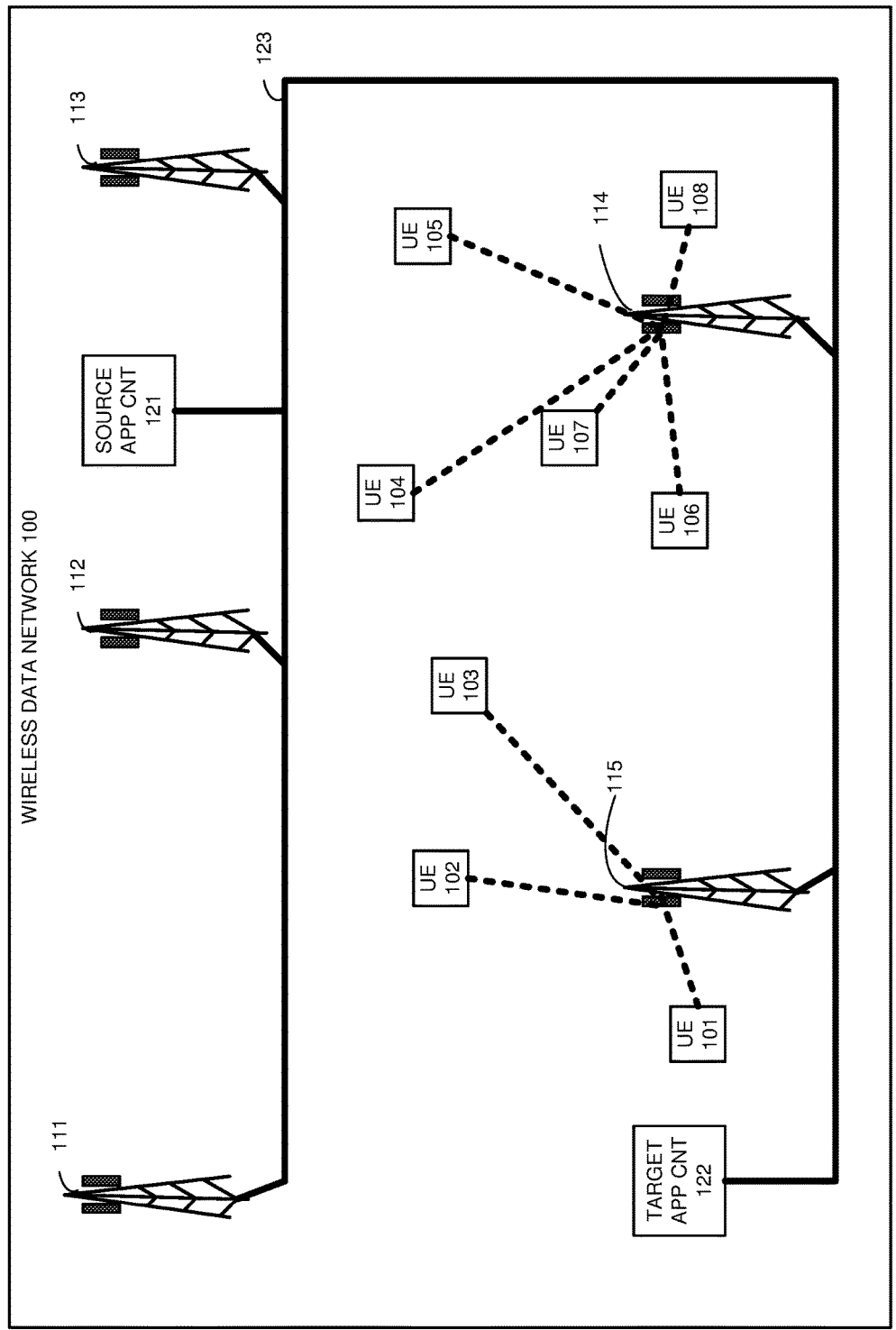
Figure 3:
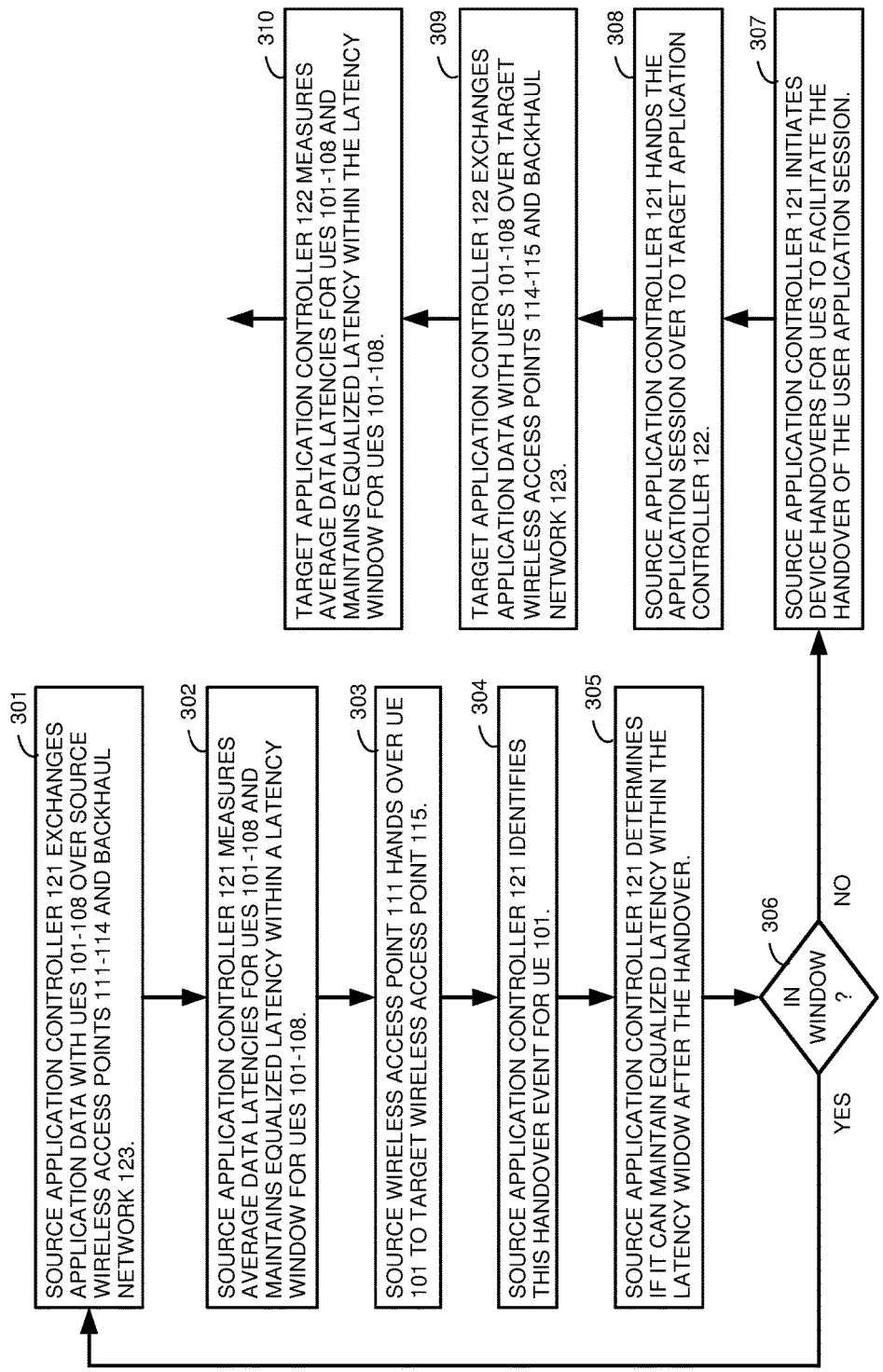

FIGS. 1-3 illustrate wireless data network 100 to equalize data latency for a user application. Referring to FIG. 1, wireless data network 100 comprises wireless User Equipment (UEs) 101-108, wireless access points 111-115, application controllers 121-122, and backhaul network 123. UEs 101-108 comprise computers, phones, headsets, and/or some other type of data transceivers. UEs 101-108 execute a user application. The user application could be social networking, virtual reality, interactive gaming, some other computerized information service. UEs 101-108 and application controllers 121-122 exchange application data over wireless access points 111-114 and backhaul network 123.

Wireless access points 111-114 comprise base stations, hotspots, relays, or some other type of wireless transceivers. Wireless access points 111-114 are made of computer hardware like Central Processing Units (CPUs), Random Access Memory (RAM), persistent data storage, bus interfaces, and data transceivers. Wireless access points 111-114 also have computer software like operating systems, user signaling, network control, and the like.

Wireless access points 111-115 and UEs 101-108 use communication protocols like Institute of Electrical and Electronic Engineers (IEEE) 802.11, Long Term Evolution (LTE), Fifth Generation (5G) wireless, Internet Protocol (IP), and the like. Wireless access points 111-115 and backhaul network 123 uses communication protocols like IEEE 802.3, IEEE 802.11, LTE, 5G, IP, TDM, WDM, DOCSYS, and the like.

Application controllers 121-122 are made of computer hardware like CPUs, RAM, persistent data storage, bus interfaces, and data transceivers. Application controllers 121-122 also have computer software like operating systems, application control, latency control, handover control, and the like. Application controllers 121-122 dynamically control the data latencies for individual UEs 101-108 to drive the UEs on the same application session to the same latency. Application controllers 121-122 may comprise Virtual Network Functions (VNFs) that execute in a Fifth Generation (5G) Network Function Virtualization (NFV) Software-Defined Network (SDN). Application controllers 121-122 serve user applications like social networking, virtual reality, interactive gaming, some other computerized information service. Application controllers 121-122 use communication protocols like IEEE 802.3, IP, TDM, WDM, DOCSYS, and the like.

For a user application session, source application controller 121 exchanges application data with UEs 101-108 over source wireless access points 111-114 and backhaul network 123. Source application controller 121 measures the average data latencies for UEs 101-108. Source application controller 121 determines if the average data latencies remain below a latency threshold that is referred to herein as a latency window. In some examples, the lower threshold of the latency window is not used. In other examples, the upper and lower thresholds of the latency window are used to group UEs by latency, and multiple latency windows may be stacked in this manner.

Source application controller 121 maintains equalized latency within the latency window on these application data exchanges. To maintain the equalized latency within the latency window, source application controller 121 measures data transfer delays using round-trip delay, time-stamps, or some other networking technique. Source application controller 121 then adjusts data delays for individual UEs 101-108 to force the same average latency among UEs 101-108. Typically, source application controller 121 controls variable First-In First-Out (FIFO) buffer sizes to converge the average latencies for UEs 101-108 on a common value. In many scenarios, source application controller 121 introduces delays to many UEs to match the UE that has the highest latency on the user application session.

Source application controller 121 maintains a data structure that correlates the actual latencies between the controllers and the UEs by their associated application controller/wireless access point pair. For example, the data structure would indicate the average latency between application controller 121 and UEs 106-108 over wireless access point 114. The data structure could also indicate the individual latency windows that are used by application controllers through individual wireless access points. For example, the data structure would indicate the latency window used by application controller 121 for UEs 102-104 over wireless access point 112.

UE 101 and source application controller 121 exchange their application data over source wireless access point 111. UE 101 then moves and source wireless access point 111 hands over UE 101 to target wireless access point 115. Source application controller 121 identifies this handover event for UE 101. To identify the handover event, application controller 121 may receive a hand-over notice from UE 101 or wireless access point 111. Alternatively, application controller 121 may identify the handover event by matching actual latency measurements for UE 101 to a changing latency pattern that represents a device handover.

In response to the device handover for UE 101, source application controller 121 determines if it can maintain equalized latency within the latency window. Source application controller 121 may perform latency testing with UE 101 over target wireless access point 115. Source application controller 121 may alternatively access a data structure that indicates average latencies for other application sessions between source application controller 121 and other UEs over target wireless access point 115.

When the equalized latency cannot be adequately maintained within the latency window, source application controller 121 hands the application session over to target application controller 122. Source application controller 121 may select target application controller 122 based on the latency data structure that indicates average latencies or latency windows for application sessions between application controllers and UEs over various wireless access points.

The device hand-over of UE 101 triggers a latency assessment, and if the latency window is violated, other application controllers are considered for the application session. Application controller 122 is selected in this example because controller 122 maintains adequate data latency through wireless access points that are near UEs 101-108. Thus, wireless access points 114-115 are found that serve the application controller 122 with adequate data latency and that have suitable proximity to UEs 101-108.

The latency window for target wireless access point 122 is not necessarily the same or better that the latency window for source wireless access point 121. The user application sessions are transferred away from application controllers that cannot maintain their latency windows to application controllers that can maintain their latency windows—even if the latency windows differ. The different latency windows may be the same, mutually exclusive, or overlapping.

The user application session handover may require UE handovers to new wireless access points. For example, source application controller 121 may select target application controller 122 based on the geographic proximity of UEs 101-108 to wireless access points 114-115 and based on UE data latencies for target application controller 122 through wireless access points 114-115. In this example, source application controller 121 initiates device handovers for UEs 102-105 from wireless access points 112-113 to wireless access points 114-115 to facilitate the handover of the user application session. To initiate the device handovers, source application controller transfers control signaling to the UEs, wireless access points, and/or their controllers to handover specific UEs to specific wireless access points.

To handover the user application session, source application controller 121 signals UEs 101-108 and target application controller 122 with the appropriate contact information and handover point in the application data flows. UEs 101-108 and target application controller 122 then establish connectivity using the contact information and exchange application data flows after the handover point to continue the application session.

Referring to FIG. 2, wireless data network 100 is depicted after the user application session handover and subsidiary device handovers. To accomplish, the user session handover, source application controller 121 instructs UEs 101-108 and target application controller 122 to exchange application data for the application session after a specified point in the data flows. For the user application session, target application controller 122 exchanges application data with UEs 101-108 over target wireless access points 114-115 and backhaul network 123. Target application controller 122 maintains equalized latency within a latency window on these application data exchanges. Thus, UE 101 and target application controller 122 exchange their application data over target wireless access point 115.

Target application controller 122 exchanges subsequent application data with UEs 101-108 over target wireless access points 114-115 for the user application session. Target application controller 122 maintains equalized latency within the latency window on these application data exchanges for the user application session. Target application controller 122 performs a similar process to that described above responsive to a device handover.

Note that uplink and downlink latencies can be separately measured and controlled. Thus, application controllers 121-122 can maintain uplink equalized latency within an uplink latency window and maintain downlink equalized latency within a downlink latency window. Application controllers 121-122 also determine if the uplink equalized latency can be maintained within the uplink latency window and if the downlink equalized latency can be maintained within the downlink latency window.

Referring to FIG. 3, the operation of application controllers 121-122 is depicted. Source application controller 121 exchanges application data with UEs 101-108 over source wireless access points 111-114 and backhaul network 123 (301). Source application controller 121 measures average data latency for UEs 101-108 (302). Source application controller 121 maintains equalized latency within a latency window on these application data exchanges (302). To maintain the equalized latency within the latency window, source application controller 121 adjusts buffer sizes for individual UEs 101-108 to converge UEs 101-108 on the same average latency.

Source wireless access point 111 hands over UE 101 to target wireless access point 115—perhaps due to device movement (303). Source application controller 121 identifies the handover event for UE 101 (304). To identify the handover event, application controller 121 may receive a hand-over notice or detect a device-handover latency pattern. In response to the device handover, source application controller 121 determines if it can maintain equalized latency within the latency window (305). The determination entails latency testing and/or access to latency data for source application controller 121 and various UEs over wireless access points 111-115.

When the equalized latency cannot be adequately maintained within the latency window (306), source application controller 121 selects target application controller 122 and initiates device handovers to facilitate the handover of the user application session to target application controller 122 (307). The controller selection may use a latency data structure that indicates average latencies or latency windows for application sessions between application controllers and UEs over various wireless access points. Source application controller 121 transfers control signaling to network controllers and/or wireless access points 111-115 to initiate the device handovers. Source application controller 121 then hands-over the user application session to target application controller 122 (308).

Target application controller 122 exchanges application data with UEs 101-108 over target wireless access points 114-115 and backhaul network 123 (309). Target application controller 122 measures average data latency to/from UEs 101-108 (310). Target application controller 122 maintains equalized latency within a latency window on these application data exchanges (310). The application session handover operations that are described above for source application controller 121 (303-307) are repeated in target application controller 122.

Figure 4:
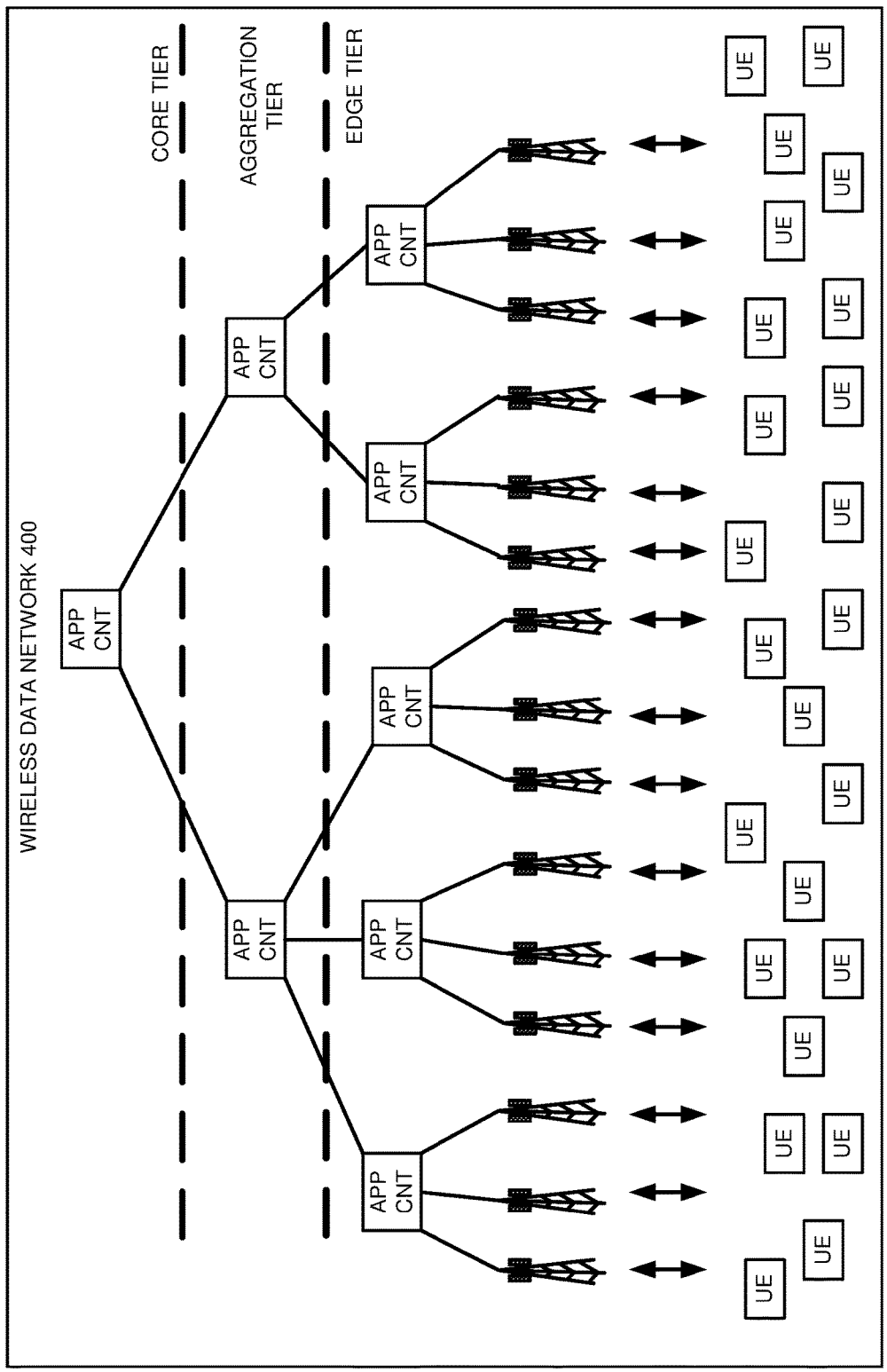
FIG. 4 illustrates a wireless data network having a tiered architecture to equalize latency for a user application.

FIG. 4 illustrates wireless data network 400 having a tiered architecture to equalize data latency for a user application. Wireless data network 400 is an example of wireless data network 100, although network 100 may use alternative configurations and operations. Wireless data network 400 has several application controllers that are geographically deployed in tiered architecture that includes a core tier, aggregation tiers, and edge tiers. The edge tier has numerous application controllers and wireless access points. The wireless access points serve a multitude of UEs that execute various applications with equalized latency requirements.

The application controllers exchange application data for several applications with the UEs over the wireless access points. The application controllers measure average data latency to and from UEs over the wireless access points. The application controllers maintain equalized latency within their own latency windows for the UES on their user application sessions. To maintain the equalized latency within the latency windows, the application controllers control variable FIFO buffer sizes to converge the average latencies for the UEs on given application session on a common value.

The application controllers may use different latency windows for different applications. The core tier application controller typically has larger latency windows than the lower tiers. The aggregation tier application controllers typically have larger latency windows than the edge tier. The edge tier application controllers typically have the smallest latency windows and the lowest latency.

The UEs and the application controllers exchange their application data over source wireless access point 111. As some of the UEs move about, the wireless access points hand-over these mobile UEs. The mobile UEs transfer hand-over notices to their application controllers. In response to the device handover notices from the mobile UEs, the application controllers determine if they can maintain equalized latency within their latency windows. The application controllers maintain a shared data structure that indicates average latencies or latency windows for application sessions between application controllers and UEs over wireless access points.

When the equalized latency cannot be adequately maintained within its latency window for an application controller, that application controller hands the application session over to another application controller that can adequately maintained within its latency window. For a given user application session, the UEs may spread from one wireless access point to numerous wireless access points. In response, the initial edge application controller will hand the application session over to an aggregation application controller. As UEs continue to spread, the aggregation application controller will hand the application session over to the core application controller. For another user application session, the UEs may traverse one wireless access point after another—for example when the UEs are in the same vehicle. In response, the edge application controllers will hand the application session over from one edge application controller to another.

Figure 5:
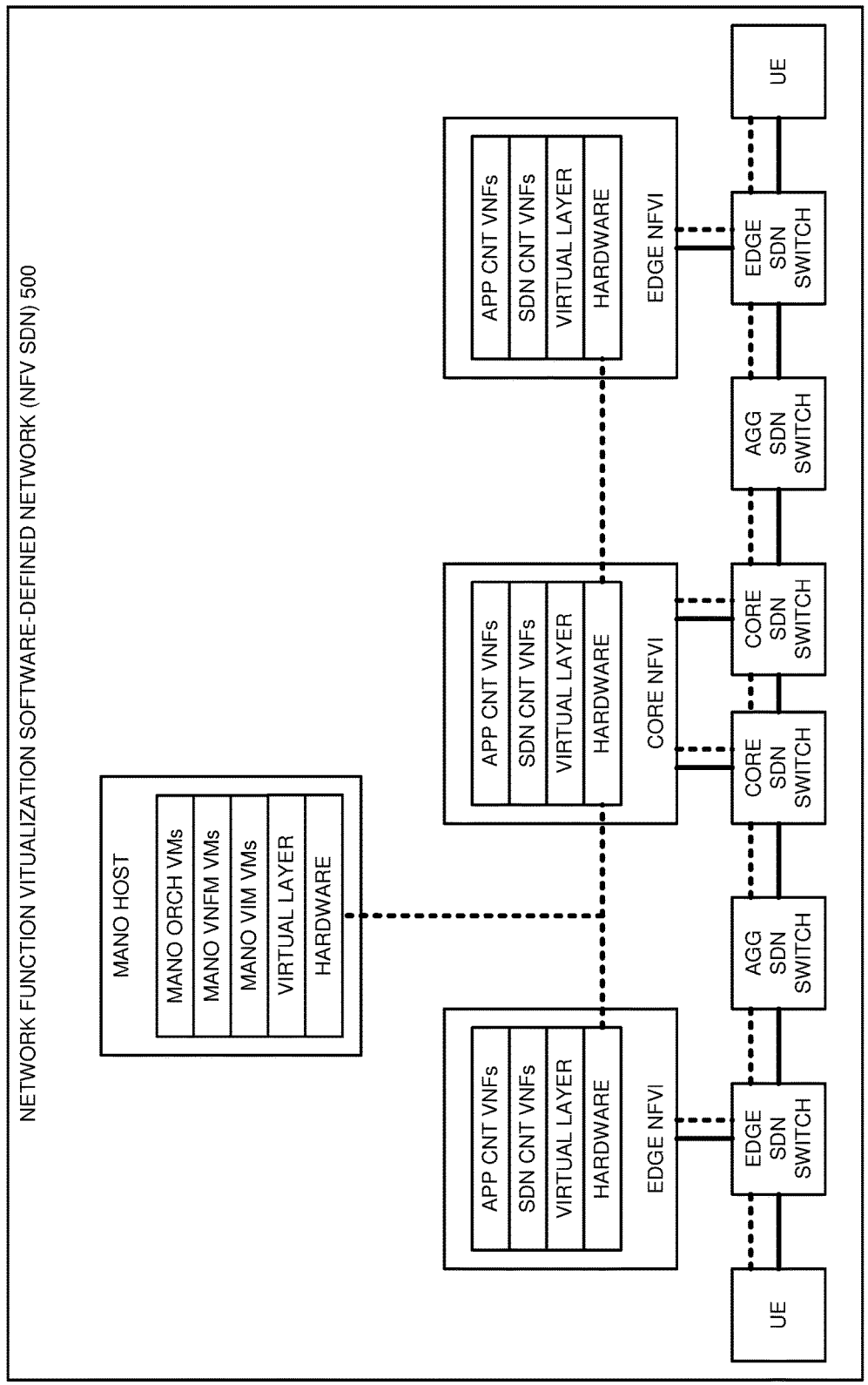
FIG. 5 illustrates a Network Function Virtualization (NFV) Software-Defined Network (SDN) to equalize latency for a user application.

FIG. 5 illustrates Network Function Virtualization (NFV) Software-Defined Network (SDN) 500 to equalize latency for a user application. NFV SDN 500 is an example of wireless data network 100, although network 100 may use alternative configurations and operations. NFV SDN 500 comprises: User Equipment (UE), edge SDN switches, aggregation (AGG) SDN switches, core SDN switches, edge NFV Infrastructures (NFVIs), core NFVI, and Management and Orchestration (MANO) host. The edge SDN switches have wireless transceivers that exchange wireless data with the UEs, and thus, the edge SDN switches comprise SDN wireless access points. The NFVIs comprise hardware such as server blades with CPU cores, data memories, transceivers, and the like. Only a few UEs, edge SDN switches, and edge NFVIs are shown for clarity, but there would typically be numerous additional edge NFVIs, SDN switches, and UEs.

The NFVIs execute virtual layer software to provide a virtualized processing environment to Virtual Network Functions (VNFs) and Virtual Machines (VMs). The virtual layer comprises virtual hardware interfaces, hypervisors, operating systems, and NFVI controllers. Under the control of the MANO host, the virtual layers support various VNFs. In the edge, aggregation, and core NFVIs, the virtual layers support SDN controller (CNT) VNFs and application controller (APP CNT) VNFs. In the MANO host, the virtual layer supports VMs for MANO Virtual Infrastructure Managers (VIMs), VNF Managers (VNFMs), and Orchestrators (ORCHs).

Under the direction of the MANO ORCHs, the VIMs and VNFMs transfer networking data to the edge and core virtual layers to drive the execution of the APP CNT VNFs and SDN CNT VNFs. To set-up data sessions for the UEs, APP CNT VNFs transfer SDN controller API calls for the UE sessions to the SDN controller VNFs. The SDN controller VNFs transfer SDN data machine API calls to the SDN switches. API responses flow back from the SDN switches to the SDN controller VNFs and to the APP CNT VNFs. The SDN switches process user data flows per Flow Description Tables (FDTs) to exchange application data between the UEs and the APP CNT VNFs. The FDTs may drive data buffering that equalizes latency among the UEs on the same user application session.

The APP CNT VNFs exchange application data for several applications with the UEs over the SDN switches. The APP CNT VNFs measure average data latency to and from UEs over the SDN switches. The APP CNT VNFs maintain equalized latency within their latency windows on these application data exchanges. To equalize latency within a latency window, the APP CNT VNFs control variable FIFO buffer sizes to converge the average latencies for the UEs on given application session on a common value. In some examples, the FIFO buffers cold be implemented in the SDN switches and remotely controlled by the APP CNT through the and SDN CNT VNFs.

The UEs and the edge SDN switches exchange the application data. As the UEs move about, the the edge SDN switches hand-over these mobile UEs to one another. The mobile UEs transfer hand-over notices to their APP CNT VNFs. In response to the device handovers for the mobile UEs, the application controllers determine if they can maintain equalized latency within their latency windows. The APP CNT VNFs maintain a shared data structure that indicates average latencies or latency windows for application sessions between APP CNT VNFs and UEs over SDN switches.

When the equalized latency cannot be adequately maintained within the latency window for an APP CNT VNF, that VNF hands the application session over to another APP CNT VNF that can adequately equalize the latency within its own latency window. For a given user application session, the UEs may spread from one edge SDN switch to many edge switches. In response, the initial APP CNT VNF in the edge NFVI will hand the application session over to an APP CNT VNF in the aggregation NFVI and perhaps than to an APP CNT VNF in the core NFVI. For a different user application session, the UEs in a vehicle may traverse one edge SDN switch after another. In response, the APP CNT VNFs in the edge NFVIs will hand the application session over along the APP CNT VNFs in the edge NFVIs.

Figure 6:
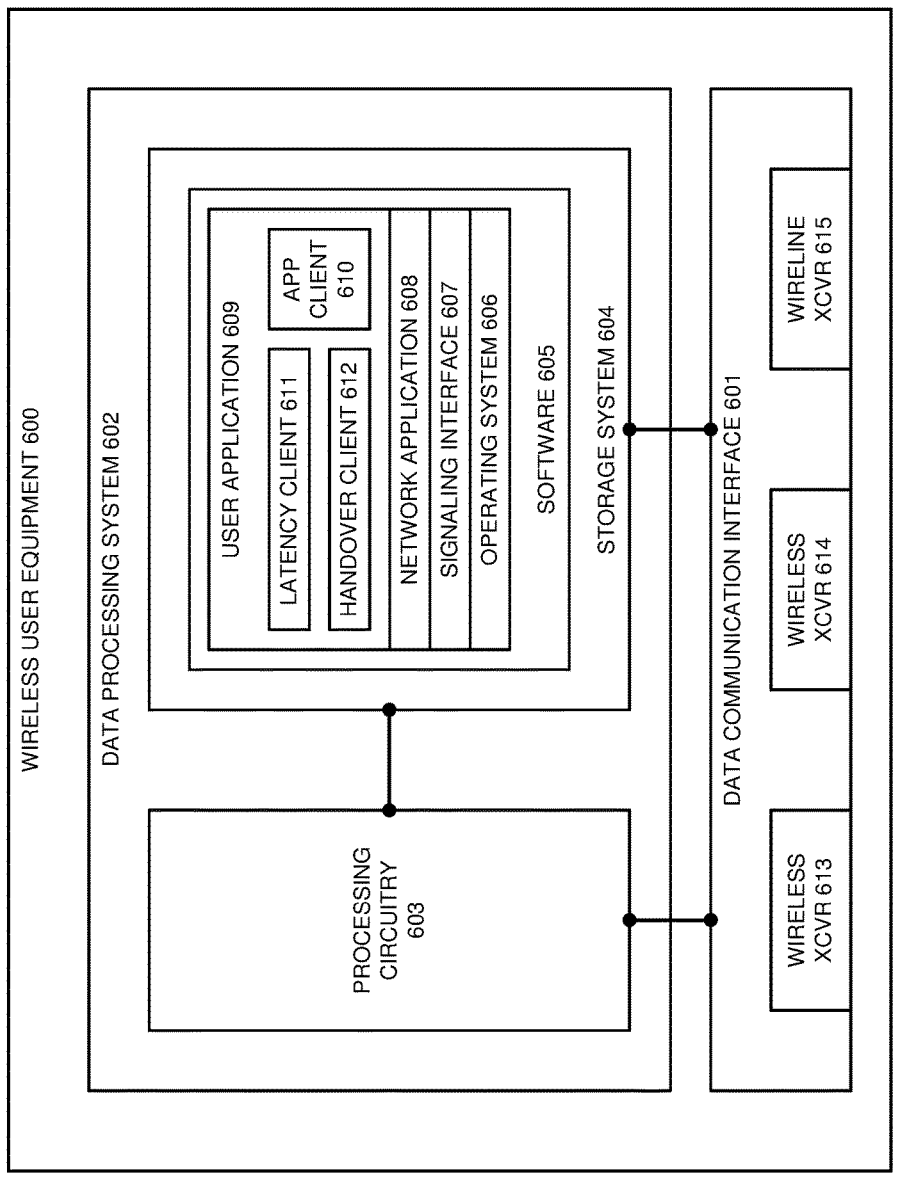
FIG. 6 illustrates wireless User Equipment (UE) to execute a user application that has equalized latency.

FIG. 6 illustrates wireless User Equipment (UE) 600 to execute a user application with equalized user latency. Wireless UE 600 is an example of UEs 101-108 although UEs 101-108 may use alternative configurations and operations. Wireless UE 600 comprises data communication interface 601 and data processing system 602. Data communication interface 601 comprises transceivers 613-615. Data processing system 602 comprises processing circuitry 603 and storage system 604. Storage system 604 stores software 605. Software 605 includes respective software modules 606-612.

Transceivers 613-615 comprise communication components, such as ports, bus interfaces, signal processors, memory, software, and the like. Wireless transceivers 613-614 comprise wireless communication components, such as antennas, amplifiers, filters, and modulators. Processing circuitry 603 comprises central processing units, circuit boards, bus interfaces, integrated circuitry, and associated electronics. Storage system 604 comprises non-transitory, machine-readable, data storage media, such as flash drives, disc drives, memory circuitry, servers, and the like. Software 605 comprises machine-readable instructions that control the operation of processing circuitry 603 when executed.

Wireless UE 600 may be centralized or distributed. All or portions of software 606-612 may be externally stored on one or more storage media, such as circuitry, discs, and the like. Some conventional aspects of UE 600 are omitted for clarity, such as power supplies, enclosures, and the like. When executed by processing circuitry 603, software modules 606-612 direct circuitry 603 to perform the following operations.

Operating system 606 interfaces between software modules 607-612 and the UE hardware (data communication interface 601, processing circuitry 603, RAM, storage system 604). Signaling interface modules 607 direct network control communications over operating system modules 606. Network application modules 608 interact with wireless networks to control the delivery of wireless data services over signaling interface modules 607. Network application modules 608 control hand-overs of UE 600 among various wireless access points.

User application modules 609 comprise application client modules 610, latency client modules 611, and handover client modules 612. Application client modules 610 interact with application controllers over operating system modules 606 to direct application operations like virtual reality gaming, media collaboration, machine controls, and the like. Latency client modules 611 interact with application controllers over operating system modules 606 to perform latency measurements on the uplink, downlink, and/or round-trip. Handover client modules 612 receive handover notifications from network application modules 608 over operating system modules 606. Handover client modules 612 interact to transfer handover notices to application controllers over operating system modules 606. Handover client modules 612 may receive handover instructions from application controllers over operating system modules 606. Handover client modules 612 interact with application controllers over operating system modules 606 to perform user application session handovers.

Figure 7:
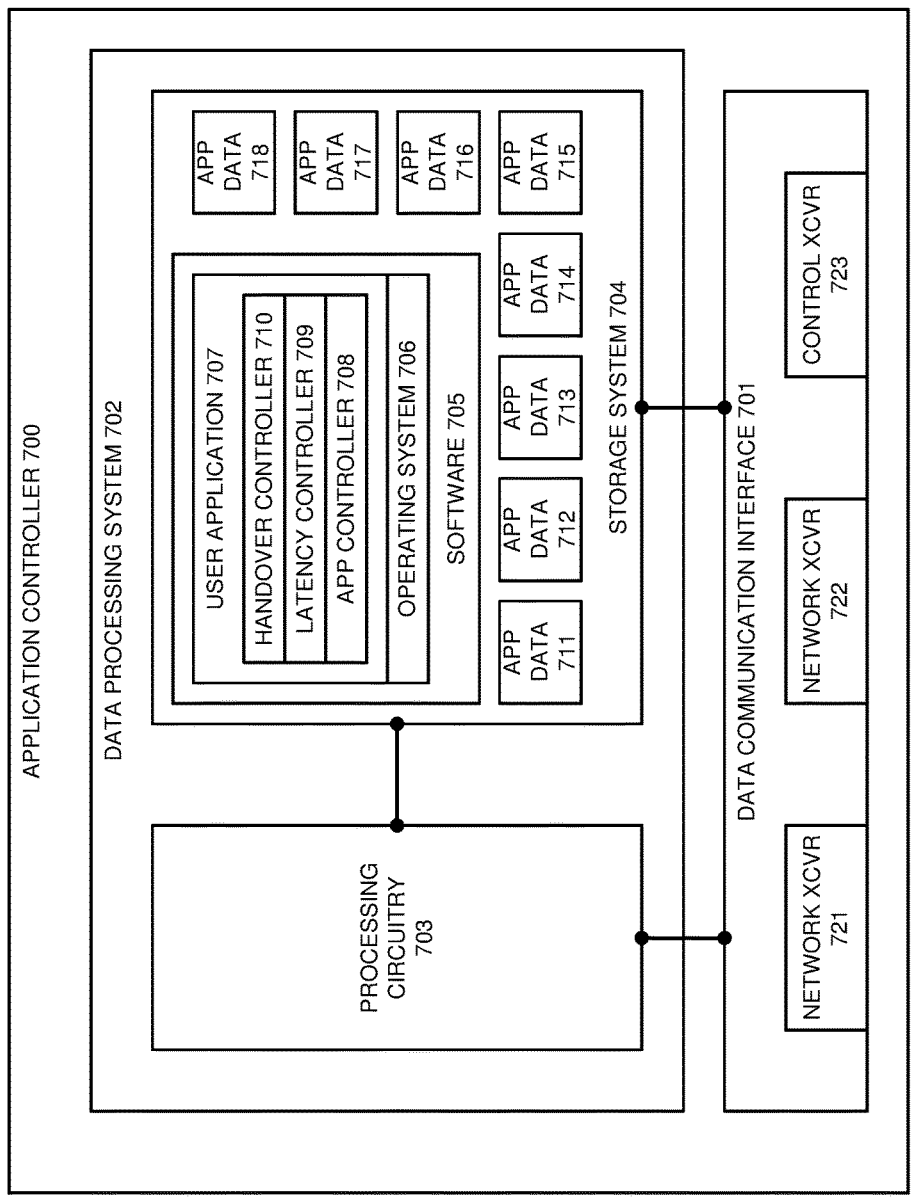
FIG. 7 illustrate an application controller to equalize latency for a user application.

FIG. 7 illustrate application controller 700 to equalize latency for a user application. Application controller 700 is an example of application controllers 121-122, although controllers 121-122 may use alternative configurations and operations. Application controller 700 comprises data communication interface 701 and data processing system 702. Data communication interface 701 comprises transceivers 721-723. Data processing system 702 comprises processing circuitry 703 and storage system 704. Storage system 704 stores software 705. Software 705 includes respective software modules 706-710.

Transceivers 721-723 comprise communication components, such as ports, bus interfaces, signal processors, memory, software, and the like. Network transceivers 721-722 exchange application data, latency measurements, and handover signaling. Control transceiver 723 exchanges control data with a master application controller or user interface.

Processing circuitry 703 comprises central processing units, circuit boards, bus interfaces, integrated circuitry, and associated electronics. Storage system 704 comprises non-transitory, machine-readable, data storage media, such as flash drives, disc drives, memory circuitry, servers, and the like. Software 705 comprises machine-readable instructions that control the operation of processing circuitry 703 when executed.

Application controller 700 may be centralized or distributed. All or portions of software 706-710 may be externally stored on one or more storage media, such as circuitry, discs, and the like. Some conventional aspects of application controller 700 are omitted for clarity, such as power supplies, enclosures, and the like. When executed by processing circuitry 703, software modules 706-710 direct circuitry 703 to perform the following operations.

Operating system 706 interfaces between software modules 707-710 and the controller hardware (data communication interface 701, processing circuitry 703, RAM, storage system 704). User application modules 707 comprise application controller modules 708, latency controller modules 709, and handover controller modules 710. Application controller modules 708 interact with user application clients over operating system modules 706 to direct the storage and exchange of application data 711-718 to support virtual reality gaming, media collaboration, machine controls, and the like. Latency controller modules 709 interact with user latency clients over operating system modules 706 to perform latency measurements on the uplink, downlink, and/or round-trip. Latency controller modules 709 introduce delay into the transfer and/or receipt of application data 711-718 to equalize latency among user application clients on the same application session.

Handover control modules 710 receive handover notifications from user handover clients over operating system modules 710. Handover control modules 710 initiate latency equalization by latency controller modules 709 over operating system modules 706. Handover controller modules 710 transfer handover requests to network controllers or user equipment over operating system modules 706. Handover controller modules 710 interact with user handover clients over operating system modules 706 to perform user application session handovers.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless data network to equalize latency for a user application, the method comprising:
    a source application controller exchanging application data with user communication devices over one or more source wireless access points for a user application session;
    the source application controller maintaining an uplink equalized latency within an uplink latency window and maintaining a downlink equalized latency within a downlink latency window on the application data exchanges for the user application session;
    the source application controller identifying a handover event for at least one of the user communication devices and responsively determining if the uplink equalized latency can be maintained within the uplink latency window and if the downlink equalized latency can be maintained within the downlink latency window;
    the source application controller handing over the application session to a target application controller when the uplink equalized latency cannot be adequately maintained within the uplink latency window or when the downlink equalized latency cannot be adequately maintained within the downlink latency window;
    the target application controller exchanging subsequent application data with the user communication devices over the one or more target wireless access points for the user application session; and
    the target application controller maintaining the uplink equalized latency within another uplink latency window and the downlink equalized latency within another downlink latency window on the subsequent application data exchanges for the user application session.

2. The method of claim 1 further comprising the source application controller initiating wireless access point handovers of at least some of the user communication devices when handing over the application session to the target application controller.

3. The method of claim 1 wherein the source application controller identifying the handover event comprises receiving a handover notification from at least one of the user communication devices.

4. The method of claim 1 wherein the source application controller identifying the handover event comprises detecting a changing latency pattern that represents a device handover.

5. The method of claim 1 the source application controller maintaining the uplink equalized latency and the downlink equalized latency comprises adjusting data delays for some of the application data exchanges for the user application session.

6. The method of claim 1 wherein the source application controller maintains a data structure that correlates average latencies for individual pairs of the application controllers and the wireless access points.

7. The method of claim 1 wherein the user application comprises virtual reality gaming.

8. The method of claim 1 wherein maintaining the uplink equalized latency and the downlink equalized latency on the application data exchanges for the user application session comprises identifying a highest latency one of the application data exchanges.

9. The method of claim 1 wherein the one or more source wireless access points and the one or more target wireless access points comprise one or more common wireless access points.

10. A wireless data network to equalize latency for a user application, the wireless data network comprising:
    a source application controller configured to exchange application data with user communication devices over one or more source wireless access points for a user application session, to maintain an uplink equalized latency within an uplink latency window and a downlink equalized latency within a downlink latency window on the application data exchanges for the user application session, to identify a handover event for at least one of the user communication devices and responsively determine if the uplink equalized latency can be maintained within the uplink latency window and if the downlink equalized latency can be maintained within the downlink latency window, and to hand over the application session to a target application controller when the uplink equalized latency cannot be adequately maintained within the uplink latency window or when the downlink equalized latency cannot be adequately maintained within the downlink latency window; and the target application controller configured to exchange subsequent application data with the user communication devices over the one or more target wireless access points for the user application session and to maintain the uplink equalized latency within another uplink latency window and the downlink equalized latency within another downlink latency window on the subsequent application data exchanges for the user application session.

11. The wireless data network of claim 10 wherein the source application controller is configured to initiate wireless access point handovers of at least some of the user communication devices when handing over the application session to the target application controller.

12. The wireless data network of claim 10 wherein the source application controller is configured to receive a handover notification from at least one of the user communication devices.

13. The wireless data network of claim 10 wherein the source application controller is configured to detect a changing latency pattern that represents a device handover.

14. The wireless data network of claim 10 wherein the source application controller is configured to adjust data delays for some of the application data exchanges for the user application session.

15. The wireless data network of claim 10 wherein the source application controller is configured to maintain a data structure that correlates average latencies for individual pairs of the application controllers and the wireless access points.

16. The wireless data network of claim 10 wherein the user application comprises virtual reality gaming.

17. The wireless data network of claim 10 wherein the source application controller is configured to identify a highest latency one of the application data exchanges.

18. The wireless data network of claim 10 wherein the one or more source wireless access points and the one or more target wireless access points comprise one or more common wireless access points.

* * * * *